Nov. 19, 1929. F. A. YEAGER Re. 17,496

WINDOW CONSTRUCTION

Original Filed Sept. 20, 1926 3 Sheets-Sheet 1

Inventor
Fay A. Yeager
By Livingston and Van Antwerp
Attorneys

Nov. 19, 1929. F. A. YEAGER Re. 17,496

WINDOW CONSTRUCTION

Original Filed Sept. 20, 1926 3 Sheets-Sheet 2

Inventor
Fay A. Yeager
By Livingston and Van Antwerp
Attorneys

Nov. 19, 1929. F. A. YEAGER Re. 17,496

WINDOW CONSTRUCTION

Original Filed Sept. 20, 1926 3 Sheets-Sheet 3

Inventor
Fay A. Yeager
By Livernace and Van Antwerp
Attorneys

Reissued Nov. 19, 1929

Re. 17,496

UNITED STATES PATENT OFFICE

FAY A. YEAGER, OF MUSKEGON, MICHIGAN, ASSIGNOR TO JOACHIM R. M. KNUDSEN, OF MUSKEGON, MICHIGAN

WINDOW CONSTRUCTION

Original No. 1,676,597, dated July 10, 1928, Serial No. 136,414, filed September 20, 1926. Application for reissue filed October 7, 1929. Serial No. 398,029.

This invention relates to a window construction, and is particularly concerned with a novel construction of window wherein the window may be held and retained in closed position, may be tilted to partly open position for ventilation purposes, or may be elevated to an upper position and automatically retained therein whereby the window is then open either for ventilation purposes or for the purpose of passing material therethrough. For instance, when the window is used in a basement of a house it may be elevated to such upward position for the introduction of fuel into the basement. The window further includes construction whereby a screen may be located therein either with the window in closed or open position and said screen is readily removable when the window is either in partial or fully open position. The invention comprises many novel details of construction and arrangements of parts for accomplishing the objects stated, understanding of which will be had from the following description taken in connection with the accompanying drawings, in which, Fig. 1 is a front elevation of the window in closed position certain parts being broken away and shown in section.

Like reference characters refer to like parts in the different views of the drawings.

Figure 1:
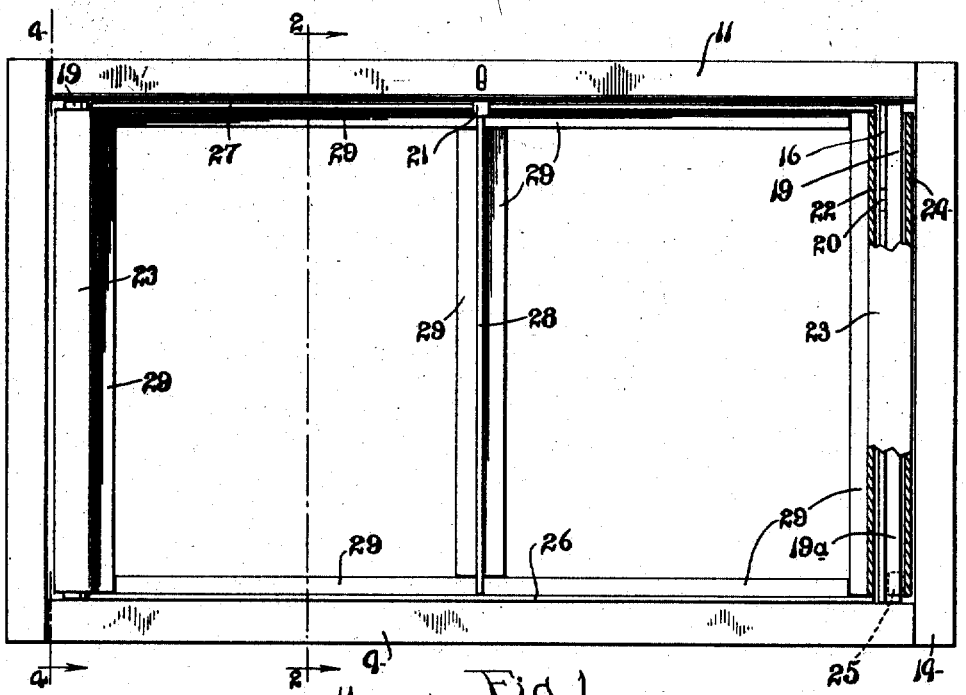

The window frame is of sheet metal and includes a lower side having an inner horizontal section 1 from which a vertical section 2 is turned upwardly for a short distance and then extended horizontally forward making the ledge 3, it at its front edge being turned down at right angles as indicated at 4. The upper side of the window frame is also of sheet metal, having a rear vertical section 5 from which a section 6 is turned horizontally forward, the metal being then formed into a series of vertical and horizontal parts 7, 8, 9 and 10, terminating finally in the upturned section 11 which lies in the same plane as section 4, previously described. The sides of the window frame in the construction shown in Figs. 1 to 7, inclusive, comprise channels having webs 12 with outturned rear and front flanges 13 and 14. To each of said sides an angle member of sheet metal is connected including a rear or inner flange 15 which lies against and is permanently secured by welding or equivalent means to the flange 13 and extending inwardly a distance beyond the web 12, being then turned to extend toward the front as indicated at 16. The front edge of the flange 16 terminates a short distance back of the plane of sections 4 and 11. This metal frame is securely connected together by welding, brazing or other equivalent manner.

Figure 5:
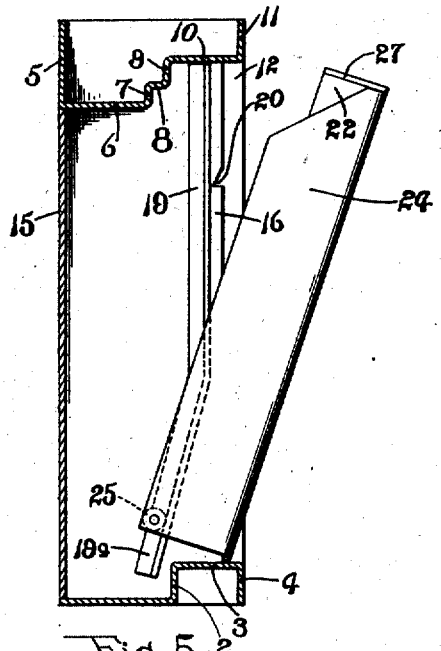
Fig. 5 is a view similar to Fig. 4, the window being tilted to partially open position.
Figure 6:
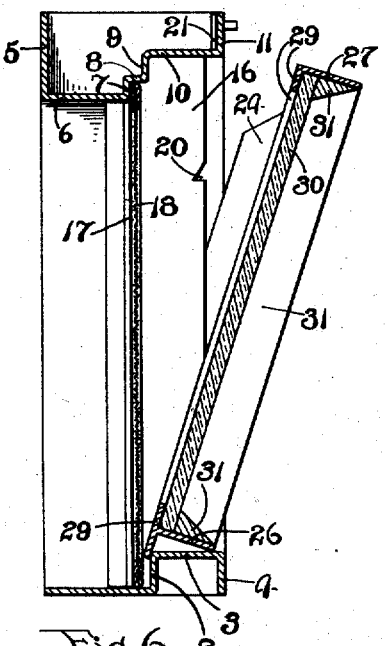
Fig. 6 is a vertical section substantially on the plane of line 2—2 of Fig. 1, the window being tilted to partly open position.
Figure 7:
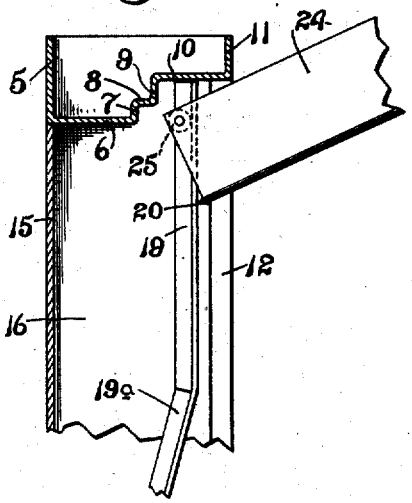
Fig. 7 is a fragmentary section on the plane of line 4—4 of Fig. 1, the window being held in upper open position.

On the inner sides of the vertical flanges 16 angle bars 17 are permanently secured, by welding the same thereto, being located substantially midway between the front and rear sides of the frame. In front of the inwardly extending flanges of the angle bars 17 a screen 18 in a suitable frame is adapted to be located, the upper bar of the screen lying in front of and against the vertical section 7 of the upper side of the window frame. At the outer side of each flange 16 and between it and the adjacent web 12 of the channel end member of the frame, an angle bar track 19 is secured, the same extending vertically downward from near the front edge of the flange 16 to which it is connected, better than one half the height of the frame opening and then being inclined downwardly and inwardly as indicated at 19[a]. In the front edges thereof, notches 20, best shown in Figs. 5 and 6 are cut, the purpose of which will later appear. Mounted substantially midway between the ends of the upper vertical section 11 is a slidable catch 21 which may be dropped to hold the window in closed position or elevated to permit its outward tilting or elevation, as will be evident.

Figure 2:
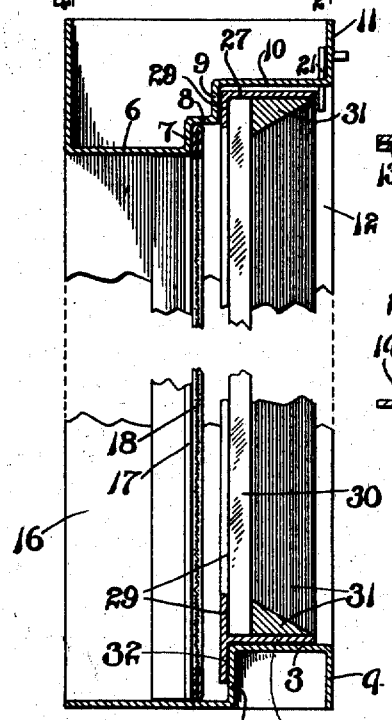
Fig. 2 is an enlarged vertical section substantially on the plane of line 2—2 of Fig. 1.
Figure 3:
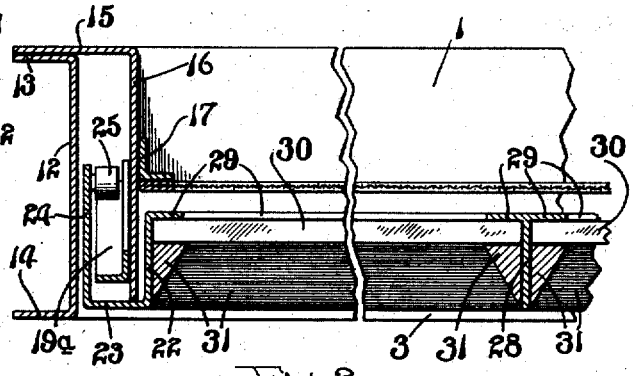
Fig. 3 is a fragmentary enlarged horizontal section through one side of the window.
Figure 4:
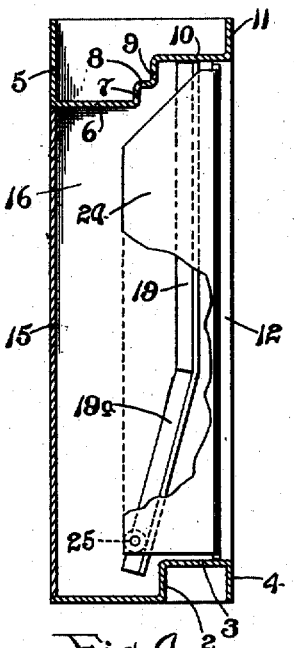
Fig. 4 is a vertical section on the plane of line 4—4 of Fig. 1, the window being in closed position and a part thereof broken away for better disclosure of structure.

The window designed to be mounted in the window frame has a metal sash with vertical sides bent into the form best shown in Fig. 3, each including an inner section 22 which lies inside of the adjacent part 16 of the window frame, its front edge being turned outwardly to make the section 23 which passes in front of the front edge of the adjacent part 16 and is then turned to the rear to provide the section 24 which lies closely adjacent and parallel to the inner side of the web 12. The angle bar track 19 is disposed between said section 24 and the part 16. A roller 25 is mounted at the lower rear corner of each of the sections 24 and bears on the tracks 19. The upper and lower rails 26 and 27 of the window sash are also of metal welded to the side members in any suitable manner. In the construction shown a vertical partition 28 is disposed midway between the ends of the window and is secured in place by welding. The sides 22, the upper and lower rails 26 and 27 and the vertical partition 28 at their rear edges are provided with lateral flanges 29 which serve as a backing for the panes 30 of glass used. Any suitable retainers indicated at 31 hold the panes in place. These retainers may be of the character shown in my copending application for patent. The lower rail 26 of the window sash at its inner rear edge also has a depending flange 32 which in the closed position of the window lies back of the vertical section 2 of the lower side of the window frame. With the window in closed position the lower side 26 of the sash rests upon the ledge 3, the flange 32 lying back of the section 2 while the upper flange 29 turned downwardly from the upper side 27 bears against the vertical section 9 of the upper side of the window frame, as shown in Fig. 2. In this position the latch 21 may be dropped to pass in front of the front edge of the upper side 27 holding the window securely in place. The screen 18 lies in back of the window, as fully shown in section 2.

The window may be tilted forward as shown in Figs. 5 and 6, it being necessary only to elevate the latch 21 and pull outward on the window whereupon it will tilt to the position shown in Figs. 5 and 6, roller 25 moving slightly upward on the inclined track 19[a]. The window will remain in this tilted position until either moved back to vertical closed position or lifted bodily to fully open position, shown in Fig. 7. In order to bring the window to the fully open position there shown, it is bodily lifted, rollers 25 running on the inclined tracks 19[a] and the vertical tracks 19 and then by turning the window outward the lower edges of the sections 23 may be brought into engagement with and seat in the notches 20 whereupon the window is securely retained in open position. In such position or in the tilted position shown in Fig. 6 it is evident that the screen 18 may be readily removed.

Figure 8:
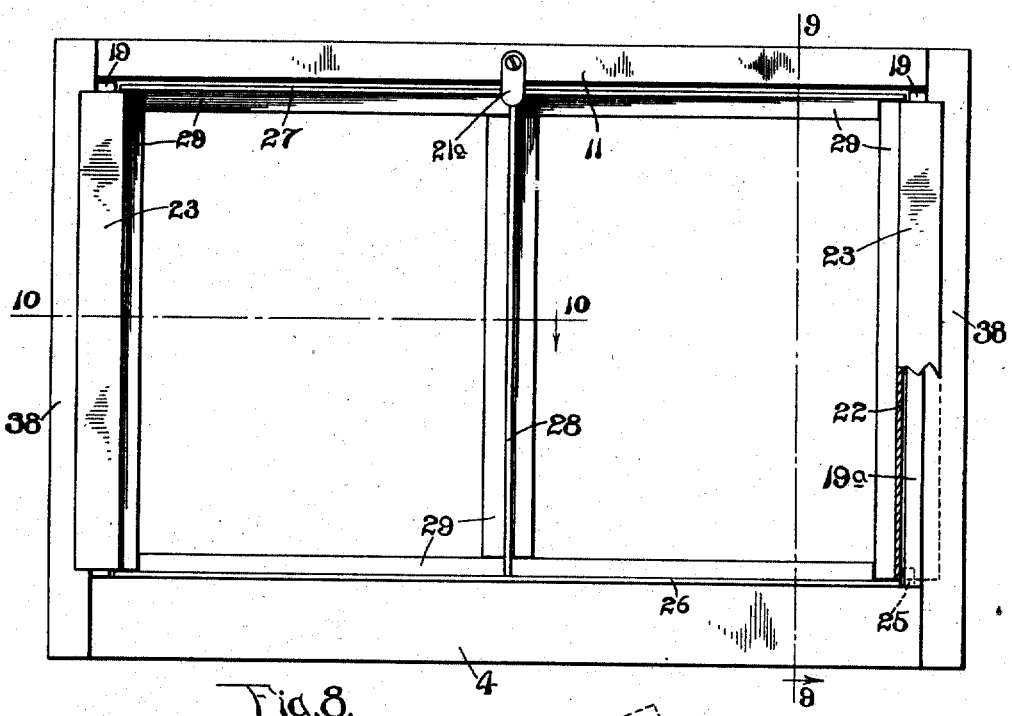
Fig. 8 is a front elevation similar to Fig. 1 showing a somewhat different form of construction of the window for attaining the same results.
Figure 9:
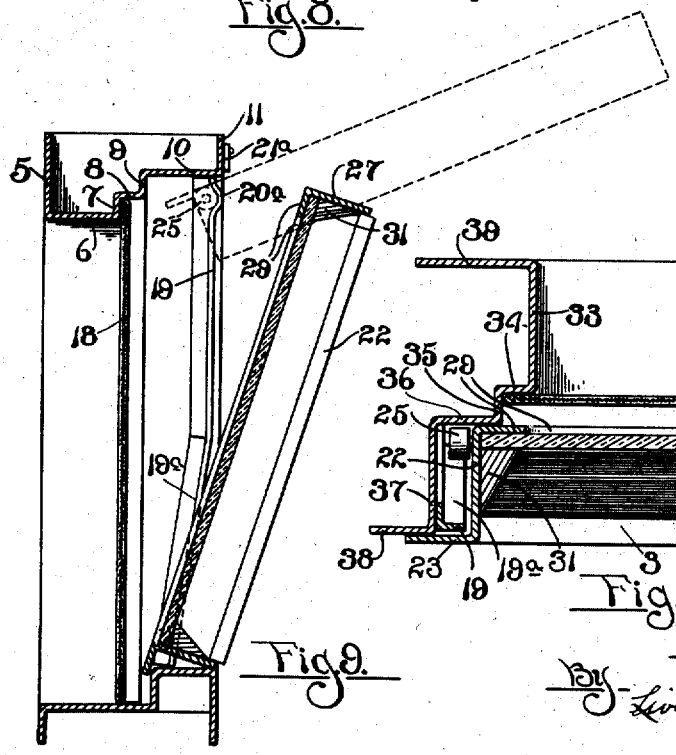
Fig. 9 is a vertical section on the plane of line 9—9 of Fig. 8 with the window in tilted position and also showing the same in dotted lines at its fully open position.
Figure 10:
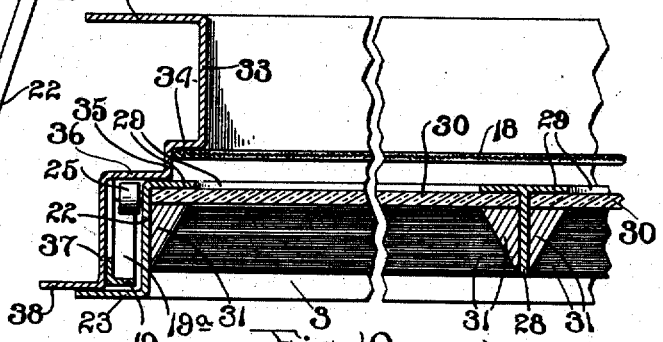
Fig. 10 is an enlarged fragmentary horizontal section on the plane of line 10—10 of Fig. 8.

In Figs. 8, 9 and 10 a different and simpler form of the invention is shown. The upper and lower sides of the window frame are substantially the same as previously described, the only difference being that the section 1 at its rear edge is provided with a down turned flange 4[a]. The vertical sides are of different form. They are bent into the shape best shown in Fig. 10, including the rear section 33 having a short section 34 bent outwardly at right angles, at its front edge then being bent into a forwardly extending section 35, from which another section 36 is bent outwardly for a distance, being then again bent to extend forwardly as indicated at 37 and finally terminating in an outwardly extending flange 38. The section 33 at its rear edge is provided with an outwardly extending section 39 lying at right angles thereto. The window sash is of substantially the same construction, with the exception that the sections 24 are eliminated. In addition the angle member comprised of the two sections 15 and 16 is absent from this construction and the track bars 19 and 19[a] are secured to the inner sides of said vertical sections 37 of the end members of the window frame, while the rollers 25 are connected to the lower corners of the vertical sections 22 of the window sash. Inasmuch as the parts 16 with the notches 20 are eliminated the inwardly extending flanges of the tracks 19 are formed near their upper ends with outwardly pressed recess portions 20[a] of a shape that the rollers 25 may seat therein. The latch 21[a] used is also slightly different being a pivotally mounted button instead of a slidably mounted button.

The holding of the screen, the closing of the window, its tilting to partly open position and its elevation to fully open position, are substantially the same as in the earlier described structure. The only difference is that when the window is lifted to fully open position, as shown in Fig. 9, it is held in such position by the rollers 25 seating in said recesses 20[a]. The effect produced and function performed is the same in both cases.

This construction of window is simple and practical, economical to manufacture and durable and efficient. It serves every purpose that may be desired. The invention is defined in the appended claims and is to be considered comprehensive of all forms of structure coming within their scope.

I claim:

1. In a window, an open rectangular frame of metal having vertical spaced apart sides, a metal flange spaced inwardly a short distance from each vertical side of the frame and permanently connected to said frame, a bar of angle form attached vertically to the outer side of each of said flanges, each of the said bars having a downwardly and inwardly inclined lower section and each having an outwardly extending flange, a sash frame adapted to be detachably located in the opening of the first frame, said sash frame having vertical sides of U-shape passing over the outer portions of said first flanges and covering the same, and a roller connected to the outer leg of the U-shaped portion of each of said vertical sides of the sash frame at the inner side of said leg and extending over and back of the adjacent flange of the angle bar connected to the said flange embraced by said U-shaped portion.

2. A construction containing the elements in combination defined in claim 1, the lower side of said open rectangular frame being formed with an upstanding horizontal ledge on which the lower side of the sash frame normally rests, and the upper side of the rectangular frame having a vertical ledge against which the back of the upper side of the sash frame normally bears, releasable means for holding the sash frame in vertical position within the open rectangular frame, said means when released permitting the sash frame to tilt outwardly at its upper end, from which position the sash frame may be bodily lifted and turned to an upper outwardly extended nearly horizontal position, and means for retaining the sash frame in the latter position.

3. A window structure comprising a rectangular frame having a front and a rear vertical side, a window sash adapted to fit within said frame and having portions overlapping the front vertical edges of the frame, a substantially vertical track on each vertical inner surface of the frame and a guide member mounted near the bottom of each vertical edge of the sash to engage and traverse the rear surface of each respective track.

4. A window structure comprising a rectangular frame having a front and rear vertical side, a window sash adapted to fit within the frame and having portions overlapping the front vertical sides of the same, a substantially vertical track on vertical inner surface of the frame, said tracks being located rearwardly of said overlapping portions of the sash and a guide member located near the bottom of each vertical edge of the sash and to the rear of said overlapping portions, said guide members being adapted to traverse said tracks.

5. A window structure comprising a rectangular frame having a front and rear vertical side, a window sash adapted to fit within the frame with its vertical sides spaced away from the respective vertical inner sides of the frame, flanges on the sash overlapping the front vertical sides of the frame, a substantially vertical track on each vertical inner side of the frame, each track being located between the respective vertical inner sides of the frame and sash and located rearwardly of said overlapping portions of the sash and a guide member mounted near the bottom of each vertical edge of the sash and to the rear of each respective track, said guide members being adapted to traverse said tracks.

6. A window structure comprising a rectangular frame, a window sash adapted to fit within the frame and having portions overlapping the front vertical sides thereof, a track on the inner surface of each vertical side of the frame, each track being inclined with its upper end nearer the front of the frame than its lower end and each track being located to the rear of said overlapping portions of the sash and a guide member located near the bottom of each vertical side of the sash, each guide member being located at the rear of said track and adapted to traverse the rear surface of the same.

7. A window structure comprising a rectangular frame, a window sash located within the frame, a substantially vertical track on each vertical member of the frame, portions on said sash overlapping the vertical members of the frame and a roller at each respective vertical side of the sash adapted to traverse one of said tracks, said rollers being located relative to the tracks and overlapping sash portions so that the said overlapping portions of the sash will engage the vertical member of the frame and the roller will bear against the track when the sash has been swung outward a short distance to limit such outward swinging motion.

8. A window structure comprising a rectangular frame, a window sash located within the frame, a substantially vertical track on each vertical member of the frame, portions on said sash overlapping the vertical members of the frame and a roller at each respective vertical side of the sash adapted to traverse one of said tracks, said rollers being located relative to the tracks and overlapping sash portions so that the said overlapping portions of the sash will engage the vertical member of the frame and the roller will bear against the track when the sash has been swung outward a short distance to limit such outward swinging motion and said track being inclined relative to the vertical member of the frame whereby said outward swinging movement of the sash will be greater when the sash is raised to an upper position than when it is in a lower position.

9. A window structure comprising a rectangular frame having front and rear vertical sides, a substantially vertical track on each vertical inner surface of the frame, a window sash adapted to fit within said frame and having portions overlapping the front surface of said track and a guide member mounted near the bottom of each vertical edge of the sash to engage and traverse the rear surface of each respective track.

10. A window comprising a rectangular frame structure including vertical tracks, a window sash located within the frame, members on the sash overlapping the front surface of the vertical members of the frame structure and guide members mounted near the lower edges of the sash to traverse the rear surfaces of the track portions of the frame structure.

11. A window comprising a rectangular frame structure including vertical tracks, a window sash located within the frame, members on the sash overlapping the front surface of the vertical members of the frame structure and guide members mounted near the lower edges of the sash to traverse the rear surfaces of the track portions of the frame structure, said vertical frame structure having notches.

12. A window comprising a rectangular frame structure including vertical tracks, a window sash located within the frame, members on the sash overlapping the front surface of the vertical members of the frame structure and guide members mounted near the lower edges of the sash to traverse the rear surfaces of the track portions of the frame structure, said vertical frame structure having notches in its front surface to receive the lower edges of the overlapping sash members.

In testimony whereof I affix my signature.

FAY A. YEAGER.